(12) United States Patent
Boutouil et al.

(10) Patent No.: US 8,936,526 B2
(45) Date of Patent: Jan. 20, 2015

(54) ADJUSTMENT MECHANISM FOR VEHICLE SEAT, VEHICLE SEAT COMPRISING SUCH A MECHANISM

(71) Applicant: Faurecia Sièges d'Automobile, Nanterre (FR)

(72) Inventors: Naoufel Boutouil, Flers (FR); Dominique Folliot, Saint Georges des Groseillers (FR); Nicolas Navatte, Conde sure Noireau (FR); Imane El Bekkali, Flers (FR)

(73) Assignee: Faurecia Sieges d'Automobile, Nanterre (FR)

( * ) Notice: Subject to any disclaimer, the term of this patent is extended or adjusted under 35 U.S.C. 154(b) by 109 days.

(21) Appl. No.: 13/908,646

(22) Filed: Jun. 3, 2013

(65) Prior Publication Data
US 2013/0333496 A1    Dec. 19, 2013

(30) Foreign Application Priority Data

Jun. 19, 2012 (FR) ................................. 12 55749

(51) Int. Cl.
| | | |
|---|---|---|
| *F16H 1/32* | (2006.01) | |
| *F16H 19/08* | (2006.01) | |
| *B60N 2/16* | (2006.01) | |
| *B60N 2/225* | (2006.01) | |
| *B60N 2/02* | (2006.01) | |
| *F16H 1/16* | (2006.01) | |

(52) U.S. Cl.
CPC ............. *F16H 19/08* (2013.01); *B60N 2/165* (2013.01); *B60N 2/2252* (2013.01); *B60N 2002/0236* (2013.01); *F16H 1/16* (2013.01)
USPC ........................................................ 475/162

(58) Field of Classification Search
None
See application file for complete search history.

(56) References Cited

U.S. PATENT DOCUMENTS

| | | | |
|---|---|---|---|
| 6,866,812 B2 | 3/2005 | Van Schaftingen et al. | |
| 7,261,379 B2 * | 8/2007 | Volker et al. | 297/367 R |
| 7,571,963 B2 * | 8/2009 | Peters et al. | 297/367 R |
| 7,648,204 B2 * | 1/2010 | Oki | 297/367 L |

(Continued)

FOREIGN PATENT DOCUMENTS

| | | |
|---|---|---|
| DE | 37 445577 A1 | 7/1989 |
| DE | 19 709852 A1 | 9/1998 |

(Continued)

OTHER PUBLICATIONS

International Search Report from corresponding PCT Application No. PCT/US2009/048005. Report Dated Aug. 17, 2009.

(Continued)

*Primary Examiner* — Dirk Wright
(74) *Attorney, Agent, or Firm* — Miller, Matthias & Hull LLP (57) ABSTRACT

An adjustment mechanism for vehicle seat, comprising a gearbox, an eccentric element driven by a driving unit, an eccentric gear wheel rotatably mounted on the eccentric element, a drive output unit equipped with an inner gear ring which cooperates with the eccentric gear wheel by partial engagement of the teeth, a sliding block equipped with a first and a second longitudinal guide, the sliding block cooperating with the eccentric gear wheel by the first longitudinal guide, the sliding block cooperating with the gearbox by the second longitudinal guide, the material of the second longitudinal guide having a lower hardness than the hardness of the material of the eccentric gear wheel.

10 Claims, 6 Drawing Sheets

(56) References Cited

U.S. PATENT DOCUMENTS

| | | | |
|---|---|---|---|
| 7,677,667 B2 * | 3/2010 | Peters et al. | 297/367 R |
| 8,215,712 B2 * | 7/2012 | Nadgouda et al. | 297/367 R |
| 8,443,816 B2 | 5/2013 | Degennes | |
| 8,720,998 B2 * | 5/2014 | Stilleke | 297/367 R |
| 2006/0261657 A1 * | 11/2006 | Luo et al. | 297/367 |
| 2009/0206643 A1 | 8/2009 | Yamamoto | |
| 2010/0084872 A1 * | 4/2010 | Winiasz | 290/55 |
| 2012/0119554 A1 | 5/2012 | Berres et al. | |

FOREIGN PATENT DOCUMENTS

| | | |
|---|---|---|
| DE | 10 2005 054 489 B4 | 8/2008 |
| DE | 10 2007 027 410 A1 | 12/2008 |
| DE | 2009 040 504 A1 | 6/2010 |
| DE | 10 2009 040 460 A1 | 3/2011 |
| DE | 10 2010 036 346 A1 | 1/2012 |
| DE | 10 2010 012 980 B4 | 11/2012 |
| DE | 10 2010 013 097 A1 | 6/2013 |
| EP | 2 163 790 A2 | 9/2009 |
| WO | WO 2005/090826 A1 | 9/2005 |
| WO | WO 2007 057 104 A2 | 5/2007 |
| WO | WO 2007 057 105 A2 | 5/2007 |
| WO | WO 2009/155544 A1 | 12/2009 |

OTHER PUBLICATIONS

Search Report for French Patent Application No. FR 12 55749. Report dated Apr. 10, 2013.

* cited by examiner

ADJUSTMENT MECHANISM FOR VEHICLE SEAT, VEHICLE SEAT COMPRISING SUCH A MECHANISM

CROSS-REFERENCE TO RELATED APPLICATIONS

This application claims priority under 35 USC §119 and the Paris Convention to French Patent Application No. FR 12 55749, filed on Jun. 19, 2012.

FIELD OF THE DISCLOSURE

The invention relates to adjustment mechanisms and to motor vehicle seats comprising such mechanisms.

BACKGROUND OF THE DISCLOSURE

More specifically, the invention relates to an adjustment mechanism for a vehicle seat, comprising a gearbox, an eccentric element driven by a driving unit, an eccentric gear wheel rotatably mounted on the eccentric element, a drive output unit equipped with an inner gear ring which cooperates with the eccentric gear wheel by partial engagement of the teeth, and a sliding block equipped with a first and a second longitudinal guide, the sliding block cooperating functionally with the eccentric gear wheel by means of the first longitudinal guide, the sliding block cooperating functionally with the gearbox by means of the second longitudinal guide.

Document EP 1 728 005 describes an example of such an adjustment mechanism in which the gearbox is made of plastic, while the sliding block is made of heat-treated metal in order to cooperate functionally with the eccentric gear wheel.

This contact between plastic and metal can have undesirable consequences. When significant stress is transmitted from the sliding block to the gearbox, for example in case of a violent impact on the vehicle, the contact between plastic and metal can cause the gearbox to break and the release of sliding block fragments.

To solve this problem, document EP 1 728 005 for example proposes the addition of a fastening flange of heat-treated metal, adapted to cooperate with the sliding block and to be attached to the plastic gearbox. This has the disadvantage, however, of requiring a supplemental part of heat-treated metal.

SUMMARY OF THE DISCLOSURE

The aim of the invention is to overcome these disadvantages.

In the invention, a vehicle seat adjustment mechanism of the type described is characterized by the material of the second longitudinal guide having a lower hardness than the hardness of the material of the eccentric gear wheel.

With these arrangements, the vehicle seat adjustment mechanism can withstand significant stresses on the seat without releasing fragments and with a limited number of parts.

In preferred embodiments of the invention, one or more of the following arrangements may be used:

- the material of the first longitudinal guide has a greater hardness than the hardness of the material of the second longitudinal guide;
- the first longitudinal guide of the sliding block cooperates functionally with a first counter-element of the eccentric element, said first longitudinal guide and said first counter-element being made of a heat-treated metal;
- the second longitudinal guide of the sliding block cooperates functionally with a second counter-element of the gearbox, said second counter-element being made of plastic and said second longitudinal guide being made of a non-heat-treated metal;
- the second longitudinal guide of the sliding block is adapted to present at least four guide surfaces, each guide surface sliding against an associated counter-surface of the second counter-element of the gearbox;
- the sliding block is made as a single part with the first and second longitudinal guides, one of the first and second longitudinal guides being heat-treated to have a different hardness than the other longitudinal guide;
- the first and second longitudinal guides are made of two separate parts, said parts being attached to each other to form the sliding block;
- the gearbox comprises at least four recesses each located behind a respective counter-surface so as to absorb a significant torque applied to the drive output unit.

Another object of the invention is a motor vehicle seat comprising an adjustment mechanism as described above.

In preferred embodiments of the invention, the vehicle seat may possibly comprise a seat bottom that is adjustable in height by a height adjustment mechanism, with the adjustment mechanism controlling the height adjustment mechanism.

BRIEF DESCRIPTION OF THE DRAWINGS

Other features and advantages of the invention will be apparent from the following description of one of its embodiments, provided as a non-limiting example, with reference to the accompanying drawings.

In the drawings.

DETAILED DESCRIPTION OF THE DISCLOSURE

The same references are used to denote identical or similar elements in different figures.

Figure 1:
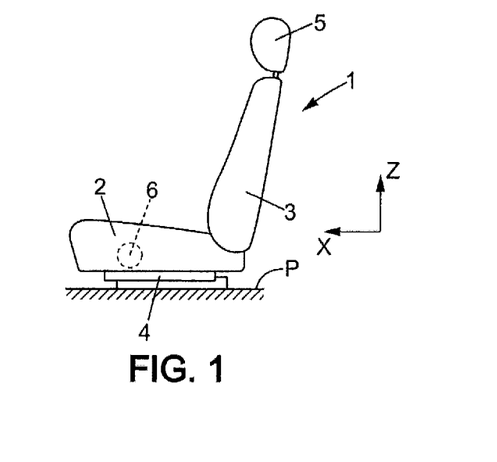
FIG. 1 is a schematic view of a vehicle seat in which the height of the seat bottom can be adjusted using an adjustment mechanism according to the invention.

FIG. 1 represents a motor vehicle seat 1 which comprises a seat back 2 supported by a seat bottom 3 mounted on the floor 4 of the vehicle, for example by means of longitudinal slide rails 5.

The seat bottom 3 is connected to the slide rails 5 by means of a known height adjustment mechanism (not represented) which allows adjusting the height of the seat bottom 3. This height adjustment mechanism is controlled by an adjustment mechanism 6, itself driven by an actuating means such as an electric motor 7 remotely controlled by the user and causing a driving unit 8 to rotate about a horizontal axis of rotation Y.

As represented in FIGS. 2 to 7, the adjustment mechanism 6 comprises a gearbox 9 forming a fixed support relative to the seat bottom. This gearbox comprises a base element 10 of plastic as well as a side plate forming a cover 11 which can be made of plastic or of metal.

The cover 11 can be assembled onto the base element 10 for example by screws 12, welding, crimping, a combination of these techniques, or any other assembly technique.

The gearbox is attached for example to the frame of the seat bottom 3 via fastening flanges 68 which are screwed, riveted, or attached by some other method.

With reference to FIGS. 2 to 7, the adjustment mechanism 6 comprises a driving unit 8 rotated by the electric motor 7 and equipped with a worm screw.

This driving unit 8 engages with a control mechanism 13 by means of an external gear ring 14 of said control mechanism 13 and rotates the control mechanism 13 on a connecting shaft 26, said connecting shaft 26 extending along a transverse axis X which is also the axis of rotation of the control mechanism 13.

The driving unit 13 has, in proximity to its axis of rotation, a protruding eccentric element 15 in the transverse axis X and onto which is rotatably mounted an eccentric gear wheel 16.

The eccentric gear wheel 16 is mounted on the eccentric element 15 so as to be able to pivot freely.

The eccentric gear wheel 16 is received inside an inner gear ring 17 of a drive output unit 18 mounted on the connecting shaft 26.

The eccentric gear wheel 16 and the inner gear ring 17 are located one above the other along the transverse axis X.

The teeth of the eccentric gear wheel 16 engage with the teeth of the inner gear ring 17 only within a narrow circumferential region.

Advantageously, the set of teeth of the eccentric gear wheel 16 and the set of teeth of the inner gear ring 17 could be adapted so that the path of contact of the gear pair formed by said sets of teeth is in the shape of an Archimedean spiral.

In this manner, the force exerted by one set of teeth on the other set of teeth of said gear pair can be distributed over several teeth in each of said sets.

The eccentric gear wheel 16 has a circumference and a number of teeth that is less than that of the inner gear ring 17 so as to engage with the latter to create a reduction ratio in a manner that will now be described.

The eccentric gear wheel 16 is prevented from rotating relative to the transverse axis X by means of a sliding block 19.

To this end, the sliding block 19 comprises a first longitudinal guide 20 and a second longitudinal guide 21.

The first longitudinal guide 20 is adapted to cooperate with a first counter-element 23 of the eccentric gear wheel 16.

To this end, the first longitudinal guide 20 has first guide surfaces 22 adapted to slide between first counter-surfaces 40 of the first counter-element 23.

The first guide surfaces 22 and the first counter-surfaces 40 are adapted so that the eccentric gear wheel 16 can only move along a straight line relative to the sliding block 19.

Thus, the contact of the first counter-surfaces 40 against the first guide surfaces 22 can for example prevent the eccentric gear wheel 16 from moving translationally relative to the sliding block 19, along the longitudinal axis Y.

Said contact can also prevent the eccentric gear wheel 16 from rotating about the transverse axis X relative to the sliding block 19.

The eccentric gear wheel 16 can, however, be free to slide relative to the sliding block 19 along a vertical axis Z perpendicular to the longitudinal axis Y.

The cooperation of the first longitudinal guide 20 with the first counter-element 23 therefore prevents translational movement along the longitudinal axis Y and rotational movement about the transverse axis X of the eccentric gear wheel 16 relative to the sliding block 19, while leaving it free to slide along the vertical axis Z.

The second longitudinal guide 21 is adapted to cooperate with a second counter-element 25 of the base element 10 of the gearbox 9.

To this end, the second longitudinal guide 21 comprises second guide surfaces 24 adapted to slide against second counter-surfaces 41 of the second counter-element 25.

The second guide surfaces 24 and the second counter-surfaces 41 are adapted so that the sliding block 19 can only move along a straight line relative to the base element 10 of the gearbox 9.

Thus, the contact of the second counter-surfaces 41 against the second guide surfaces 24 can for example prevent the sliding block 19 from moving relative to the gearbox 9 along the vertical axis Z.

Said contact can also prevent the sliding block 19 from rotating about the transverse axis X relative to the gearbox 9.

The sliding block 19 can, however, slide freely relative to the gearbox 9 along the longitudinal axis Y.

The cooperation of the second longitudinal guide 21 with the second counter-element 25 therefore prevents translational movement along the vertical axis Z and rotational movement about the transverse axis X of the sliding block 19 relative to the gearbox 9, while leaving it free to slide along the longitudinal axis Y.

In this manner, the eccentric gear wheel 16 can only move circularly and translationally relative to the gearbox 9 within a plane Y-Z, and in particular is prevented from rotating about the transverse axis X relative to the gearbox 9 due to the cooperation of the first and second longitudinal guides 20, 21 of the sliding block 19 with the first and second counter-elements 23, 25 of the eccentric gear wheel 16 and the base element 10 of the gearbox 9.

The eccentric gear wheel 16 therefore accomplishes a circular translational movement inside the eccentric gear wheel 17, during which the circumferential region where the teeth of the eccentric gear wheel 16 engage with the teeth of the inner gear ring 17 moves angularly along each of these sets of teeth.

A complete circle of the eccentric gear wheel 16 within the inner gear ring 17 angularly offsets the drive output unit 18 relative to the gearbox 9 by the difference in the number of teeth between the eccentric gear wheel 16 and the inner gear ring 17, which generates the reduction ratio.

In an embodiment illustrated in FIGS. 2 to 7, the first longitudinal guide 20 can consist of a linear opening made in the sliding block 19 and in which the sides constitute the first guide surfaces 22. The first counter-element 23 can then comprise square cross-sectioned fingers which protrude from the eccentric gear wheel 16 in order to fit into said linear opening.

The second longitudinal guide 21 can consist of several extensions having a rectangular cross-section 32, for example two or four extensions 32, projecting along the longitudinal axis Y from the body of the sliding block 30, and of which the upper and lower sides constitute the second guide surfaces 24.

The second counter-element 25 can then comprise longitudinal grooves 31 made in the gearbox 9, for example in the base element 10, and which receive said rectangularly cross-sectioned extensions.

As variants, other forms can be considered for the first and second longitudinal guides 20, 21 and the first and second counter-elements 23, 25. In particular, said linear opening can be open at one of its ends, replaced by two slots. Said grooves could also be replaced by one or more appropriate openings made in the sliding block 19.

The longitudinal guides could also be replaced by rectangular openings or protruding extensions fitting into counter-elements comprising respective protruding extensions or rectangular openings.

The number of surfaces and counter-surfaces of each longitudinal guide and each associated counter-element can be adapted by a person skilled in the art, and can for example be between two and eight surfaces per longitudinal guide, for example four surfaces.

Lastly, the translational directions allowed by the cooperation of each of the sets formed by a longitudinal guide and an associated counter-element could be adjusted by a person skilled in the art and in particular be moved away from the longitudinal Y and vertical Z axes.

Said directions will advantageously be perpendicular to the axis of rotation of the eccentric gear wheel 16 and of the inner gear ring 17.

In an embodiment presented in FIGS. 2 to 7, the gearbox 9 comprises recesses 39 in proximity to the second counter-surfaces 41 of the base element 10.

Advantageously, the recesses 39 are placed behind said counter-surfaces 41, meaning on the side opposite the area of contact between said second counter-surface 41 and the respective second guide surface 24.

In this manner, the second counter-element 25 can absorb significant stresses exerted suddenly on the height adjustment mechanism, for example by giving way to pressure from the second guide surfaces of the sliding block 19.

To increase the durability of the mechanism, the eccentric gear wheel 16 is advantageously made of heat-treated metal.

The eccentric element 15 is also advantageously made of heat-treated metal.

Said heat-treated metal can be any type of metal used by a person skilled in the art of the invention, and any heat treatment known to a person skilled in the art can be used for this purpose.

The first longitudinal guide 20 can then be made of a heat-treated metal so that its hardness is sufficient for the interaction of the first longitudinal guide 20 with the eccentric gear wheel 16 not to cause excessive wear on said guide.

Any heat treatment compatible with the material of the first longitudinal guide can be used for this purpose by a person skilled in the art, as long as it allows obtaining a hardness sufficient to withstand the wear from said interaction over the desired life of the mechanism, for example a hardness near that of the eccentric gear wheel 16.

As the gearbox is made of plastic, the second longitudinal guide 21 can advantageously be made of a material of a lower hardness than the hardness of the eccentric gear wheel 16, for example a non-heat-treated metal.

In this manner, when a forceful impact occurs, for example during a crash, and significant stress is applied on the gearbox by the second longitudinal guide 21, the lower hardness of the material constituting the second longitudinal guide 21, and therefore its greater elasticity, prevents the gearbox 9 from fracturing and the release of fragments from the sliding block 19 to outside the gearbox 9.

The hardness of the materials constituting the first and second longitudinal guides can be verified by any known method for measuring hardness, such as rebound hardness or indentation hardness conducted for example by means of a Vickers Hardness Test, a Brinell Hardness Test, or a Rockwell Hardness Test.

In a first embodiment of the invention, the sliding block 19 and the first and second longitudinal guides 20,21 can be made as a single part.

The sliding block 19 can thus be completely made of a non-heat-treated metal, and a heat treatment can be applied to the portion of the sliding block comprising the first longitudinal guide 20 so as to increase its hardness.

As a variant, a heat treatment can be applied to the portion of the sliding block comprising the second longitudinal guide 21 in order to decrease the hardness.

In another embodiment, the first and second longitudinal guides can be made as two separate parts, for example two parts made of materials of different hardnesses.

Said parts can then be assembled together and to additional parts to form the sliding block 19.

For example, one or more inserts made of heat-treated metal or non-heat-treated metal can be secured to a main sliding block part 19 so as to create said first and/or second longitudinal guides 20, 21.

In one embodiment, the first counter-element 23 of the eccentric gear wheel 16 can also be made of non-heat-treated metal and secured to the eccentric wheel 16, said eccentric wheel being made of heat-treated metal.

In one embodiment, the control mechanism 13 can be rotatably mounted on the connecting shaft 26 and the drive output unit 18 can be mounted in a fixed manner on the connecting shaft 26. In an alternative embodiment, the fixed and rotating characteristics of said units relative to the connecting shaft 26 can be exchanged.

Figure 2:
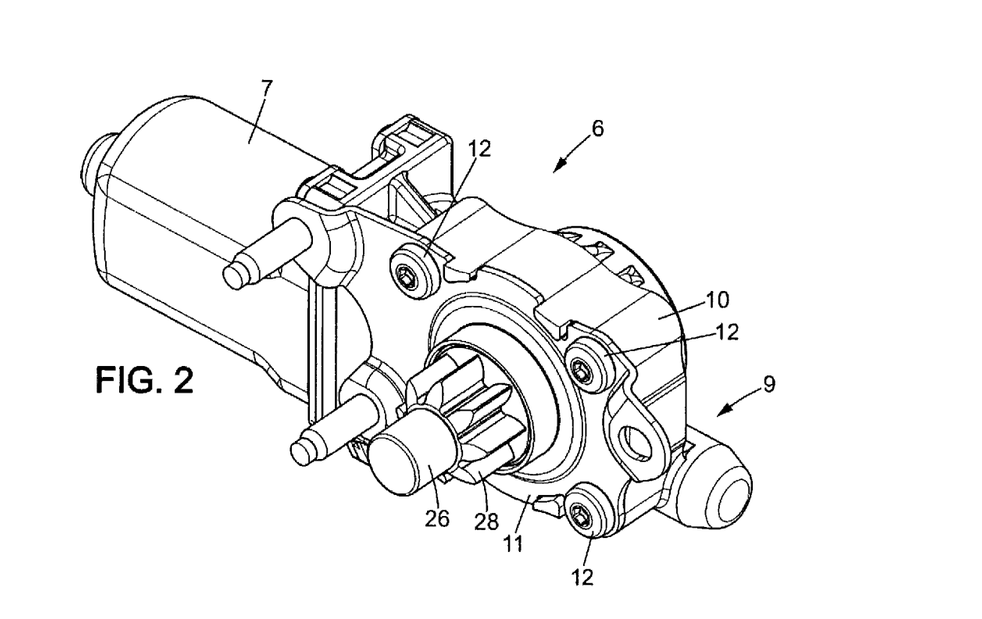
FIG. 2 is a perspective view of the adjustment mechanism of the seat of FIG. 1.
Figure 3:
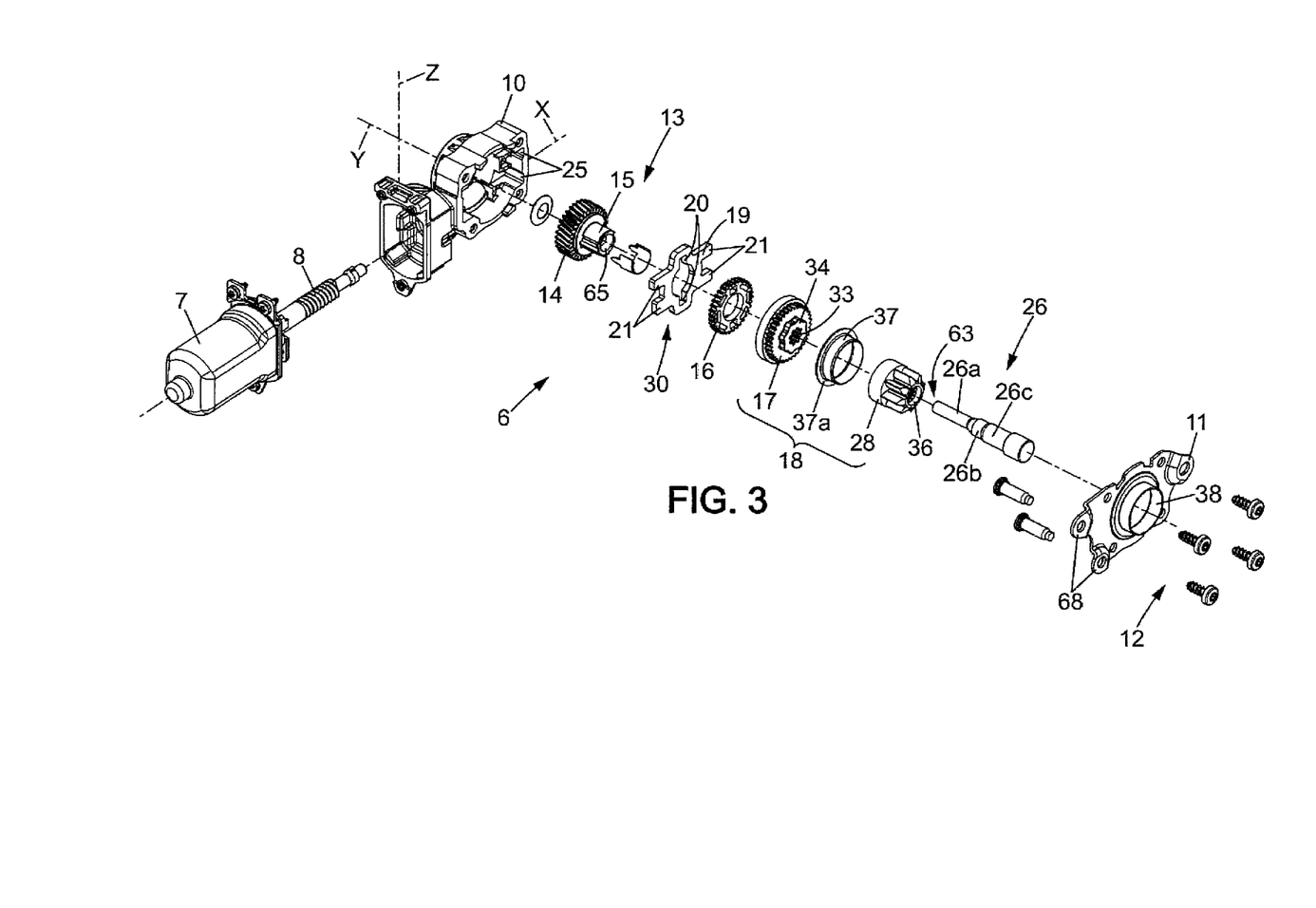
FIG. 3 is a exploded perspective view of the adjustment mechanism of FIG. 2.
Figure 4:
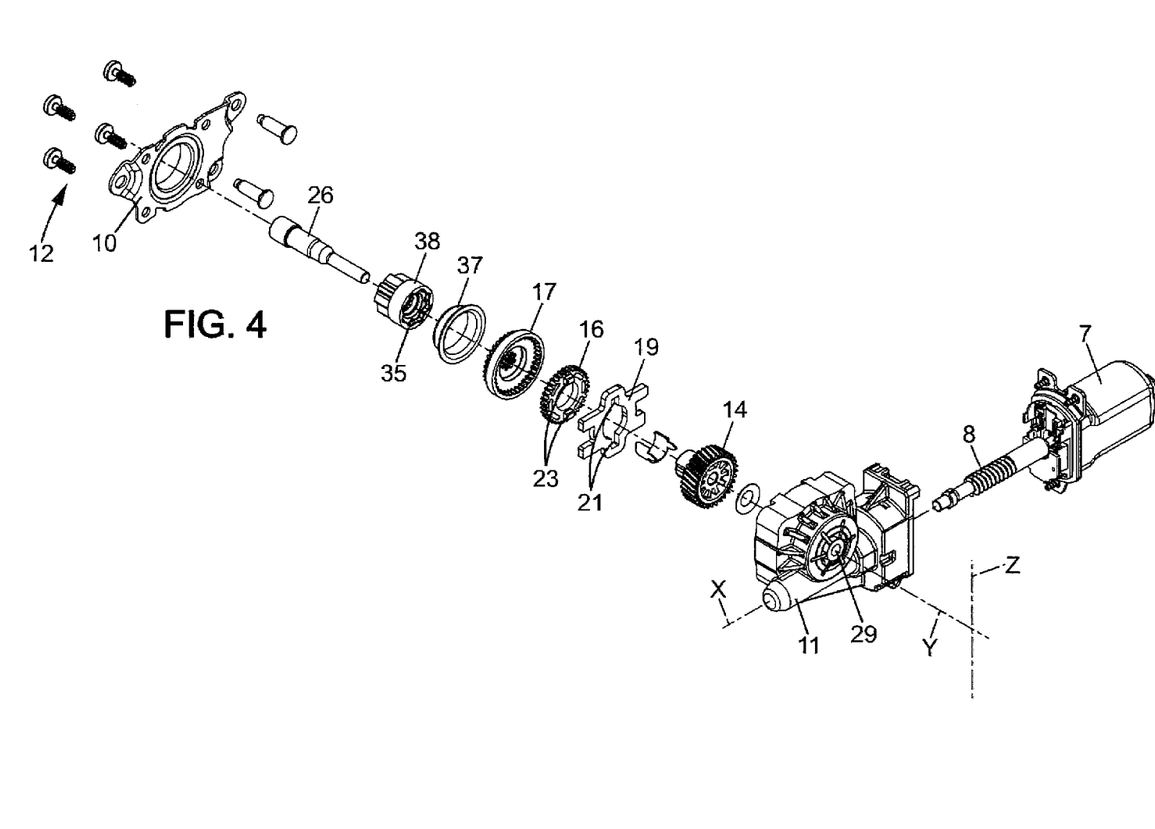
FIG. 4 is another exploded perspective view of the adjustment mechanism of FIG. 2.
Figure 5:
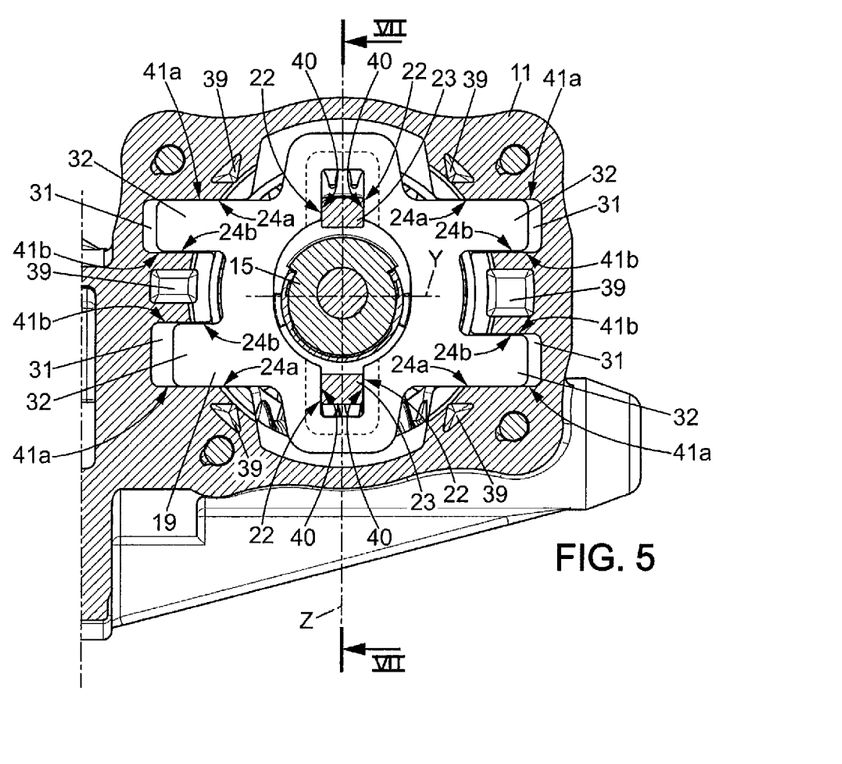
FIG. 5 is a transverse cross-sectional view of the mechanism of FIG. 2.
Figure 6:
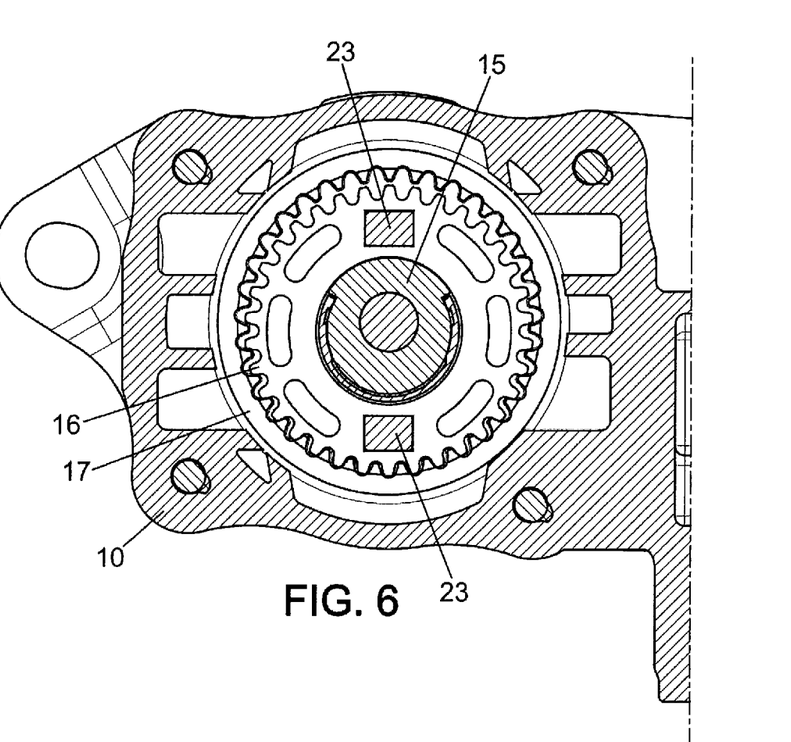
FIG. 6 is another transverse cross-sectional view of the mechanism of FIG. 2.
Figure 7:
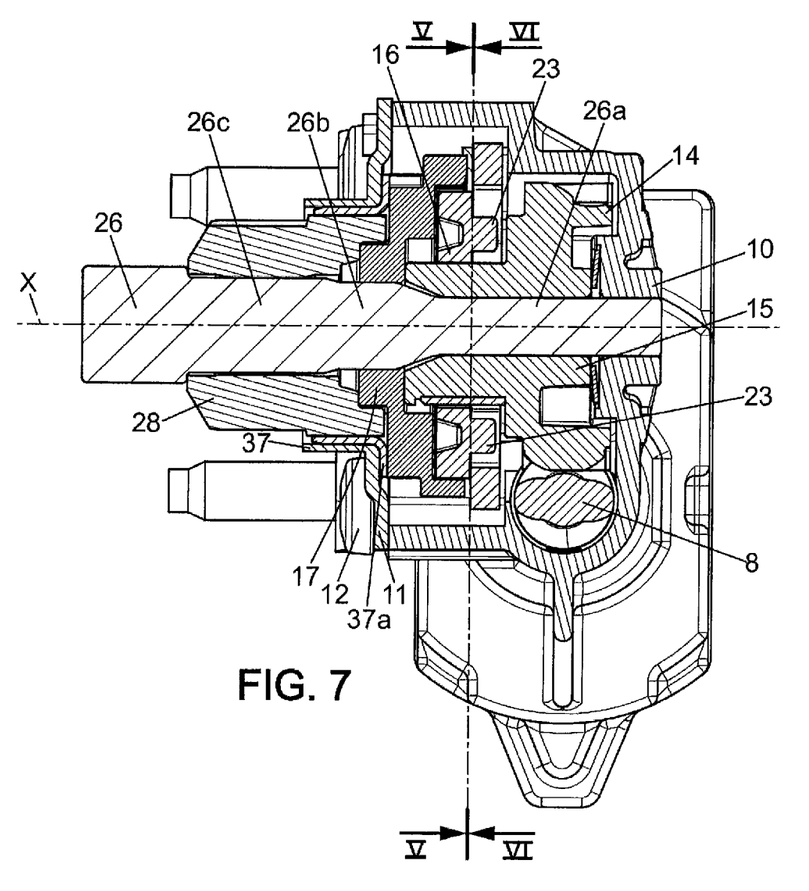
FIG. 7 is a longitudinal cross-sectional view of the mechanism of FIG. 2.

In the embodiment represented in FIGS. 2 and 3, the control mechanism 13 is rotatably mounted on the connecting shaft 26, and for this purpose comprises a smooth axial through-hole 65 which accepts, with substantially no play, a first cylindrical section 26*a* formed in a first end 63 of the connecting shaft 26.

A second cylindrical section 26*b* of the connecting shaft 26 has a larger diameter than the first cylindrical section 26*a* and is connected to it by a conical portion.

An axial opening 33 of the inner gear ring 17, equipped with radial teeth, can accommodate the second cylindrical section 26*b* without any play. The inner gear ring 17 and the connecting shaft 26 are then fully secured to each other rotationally about the transverse axis X.

The drive output unit 18, preferably made of metal, can in addition comprise a pinion 28 solidly attached to the inner gear ring 17 and engaged with the element of the height adjustment mechanism located downstream from the adjustment mechanism 6 and not represented in the figures.

To maintain said pinion 28, the inner gear ring 17 may for example have a splined disk 34 at its axial end which can be received without any play in a complementary splined housing 35 that is part of the pinion 28.

To further secure the inner gear ring 17, the pinion 28, and the connecting shaft 26 to rotate together about the transverse axis X, a third cylindrical section 26*c* can be accommodated in an axial opening 36 in the pinion. Said opening can also equipped with radial teeth so as to accept the third cylindrical section 26*c* without any play and secure the pinion 28 and the connecting shaft 26 to rotate together about the transverse axis X.

In the embodiment presented in FIGS. 2 to 7, the connecting shaft 26 is rotationally guided:

on the one hand, by means of a smooth axial neck 29, cylindrical in shape, centered on the transverse axis X and traversing the radial wall of the bottom of the base element 10 of the gearbox, this neck 29 receiving, with substantially no play, the end of the first cylindrical section 26a of the connecting shaft 26, on the other hand, by means of a second bearing, formed here by a guide ring 37 of plastic or other material, which has a generally cylindrical shape centered on the axis of rotation X and is arranged inside an axial borehole 38 in the cover 11 of the gearbox 9. The guide ring 31 accommodates a cylindrical section 28a formed on the pinion 28 at the axial end opposite the teeth of said pinion. The guide ring 31 can comprise a peripheral collar 31a which comes to press against the inside of the cover 11.

The invention claimed is:

1. An adjustment mechanism for a vehicle seat, comprising:
    a gearbox,
    an eccentric element driven 5 by a driving unit,
    an eccentric gear wheel rotatably mounted on the eccentric element,
    a drive output unit equipped with an inner gear ring which cooperates with the eccentric gear wheel by partial engagement of the teeth,
    a sliding block equipped with a first and a second longitudinal guide, the sliding block cooperating functionally with the eccentric gear wheel by means of the first longitudinal guide, the sliding block cooperating functionally with the gearbox by means of the second longitudinal guide,
    wherein the material of the second longitudinal guide has a lower hardness than the hardness of the material of the eccentric gear wheel.

2. The mechanism according to claim 1, wherein the material of the first longitudinal guide has a greater hardness than the hardness of the material of the second longitudinal guide.

3. The mechanism according to claim 1, wherein the first longitudinal guide of the sliding block cooperates functionally with a first counter-element of the eccentric element, said first longitudinal guide and said first counter-element being made of a heat-treated metal.

4. The mechanism according to claim 1, wherein the second longitudinal guide of the sliding block cooperates functionally with a second counter-element of the gearbox, said second counter-element being made of plastic and said second longitudinal guide being made of a non-heat-treated metal.

5. The mechanism according to 1, wherein the second longitudinal guide of the sliding block is adapted to present at least four guide surfaces, each guide surface sliding against an associated counter-surface of the second counter-element of the gearbox.

6. The mechanism according to 1, wherein 5 the sliding block is made as a single part with the first and second longitudinal guides, one of the first and second longitudinal guides being heat-treated to have a different hardness than the other longitudinal guide.

7. The mechanism according to claim 1, wherein the first and second longitudinal guides are made of two separate parts, said parts being attached to each other to form the sliding block.

8. The mechanism according to claim 1, wherein the gearbox comprises at least four recesses each located behind a respective counter-surface so as to absorb a significant torque applied to the drive output unit.

9. A motor vehicle seat comprising an adjustment mechanism according to claim 1.

10. The seat according to claim 9, comprising a seat bottom that is adjustable in height by a height adjustment mechanism, with the adjustment mechanism controlling the height adjustment mechanism.

\* \* \* \* \*